(12) United States Patent
Berckmans et al.

(10) Patent No.: US 8,552,178 B2
(45) Date of Patent: Oct. 8, 2013

(54) PROCESS FOR MODIFICATION OF BIOPOLYMERS

(75) Inventors: Marc Charles Florent Berckmans, Brussels (BE); Dogan Sahin Sivasligil, The Hague (NL)

(73) Assignee: Cargill, Incorporated, Wayzata, MN (US)

( * ) Notice: Subject to any disclaimer, the term of this patent is extended or adjusted under 35 U.S.C. 154(b) by 799 days.

(21) Appl. No.: 12/158,974

(22) PCT Filed: Dec. 21, 2006

(86) PCT No.: PCT/EP2006/070112
§ 371 (c)(1),
(2), (4) Date: Jun. 23, 2008

(87) PCT Pub. No.: WO2007/071774
PCT Pub. Date: Jun. 28, 2007

(65) Prior Publication Data
US 2008/0306254 A1    Dec. 11, 2008

(30) Foreign Application Priority Data
Dec. 22, 2005  (EP) .................................... 05257998

(51) Int. Cl.
*C08B 31/18*  (2006.01)
*C08B 30/12*  (2006.01)

(52) U.S. Cl.
CPC ............. *C08B 31/18* (2013.01); *C08B 30/12* (2013.01)
USPC .......................................... 536/102; 536/105

(58) Field of Classification Search
None
See application file for complete search history.

(56) References Cited

U.S. PATENT DOCUMENTS

| 2,354,838 | A  | * | 8/1944  | Schopmeyer et al. ........... 127/33 |
| 2,999,090 | A  | * | 9/1961  | Hobbs ............................. 536/105 |
| 3,615,786 | A  | * | 10/1971 | Moskaluk ..................... 106/208.1 |
| 6,235,894 | B1 | * | 5/2001  | Kettlitz et al. ................. 536/102 |
| 6,469,161 | B1 | * | 10/2002 | Fuertes et al. ................. 536/55.3 |
| 6,482,267 | B1 |   | 11/2002 | Fuertes et al. |
| 6,531,592 | B1 |   | 3/2003  | Fuertes et al. |
| 6,586,588 | B1 | * | 7/2003  | Cimecioglu et al. .......... 536/104 |
| 2008/0300400 | A1 | * | 12/2008 | Berckmans et al. ........... 536/107 |

FOREIGN PATENT DOCUMENTS

| EP | 0 041 316 | 2/1985 |
| EP | 0 710 670 | 6/2000 |
| EP | 0 902 037 | 7/2003 |
| GB | 534 503   | 3/1941 |

OTHER PUBLICATIONS

Altafini et al., "Robust Control of a Flash Dryer Plant" Proceedings of the 1997 IEEE International (1997) pp. 785-790.*
Thomas and Atwell, "Starches," Eagan Press Handbook Series, American Association of Cereal Chemists, St. Paul, Minnesota (1999), pp. 25-30.

* cited by examiner

*Primary Examiner* — Eric S Olson

(57) ABSTRACT

A biopolymer thinning process is provided comprising the steps of (a) mixing a biopolymer substrate with a thinning agent and an alkalizing agent; and (b) drying the mixture of step (a), wherein the thinning agent consists of one or more hypochlorites; and step (a) is carried out at a neutral to alkaline pH and does not involve any artificial heating.

23 Claims, 3 Drawing Sheets

PROCESS FOR MODIFICATION OF BIOPOLYMERS

CROSS-REFERENCE TO RELATED APPLICATIONS

This application is a National Stage application under 35 U.S.C. §371 and claims benefit under 35 U.S.C. §119(a) of International Application No. PCT/EP2006/070112 having an International Filing Date of Dec. 21, 2006, which claims the benefit of priority of EP 05257998.4 having a filing date of Dec. 22, 2005.

FIELD OF THE INVENTION

The present invention relates to a process for the modification of biopolymers by thinning. More particularly, it relates to an improved process for starch thinning, and to thinned starches obtained thereby.

BACKGROUND OF THE INVENTION

Starch is a very commonly used material in a number of technical and industrial applications including, for example, in the production of building materials, the manufacture of paper, the treatment of textiles, the preparation of adhesives and the formulation of products such as detergent tablets or pharmaceuticals. They are also used in a variety of food applications as thickeners, binders, emulsifying agents and gelling agents, for instance.

Starch is a pseudo-crystalline material consisting of two polymers of alpha-D-glucose: amylose and amylopectin. Amylose is essentially a linear polymer in which glucose molecules are bound through alpha 1-4 bonds while amylopectin is a branched polymer containing both alpha 1-4 and 1-6 linkages.

Depending on its required use and functionality, the nature and structure of the starch molecule may have to be modified. This can be achieved by a number of techniques including thermal, chemical and enzymatic treatment.

In most applications, starch is used in the form of a gelatinised paste. Depending on the modifications performed, and its desired end use, the starch paste will have a higher or lower viscosity.

When a low viscosity is required, starch molecules are usually submitted to a process known as thinning. Thinning can be carried out in the wet phase (where water is used as a vehicle for the reactants) or in the dry phase (characterised by the absence of a solvent medium).

Examples of wet phase thinning include acid-modification and oxidation. Both must be carried out below the gelatinization temperature of the starch and have relatively long reaction times. The reaction slurry must have a pH which is adjusted to a more or less neutral value and, after the thinning process has been completed, it must be washed to remove salts which are used to inhibit gelatinization.

A key limitation of this wet technology is the amount of water that is wasted and the costs associated with its treatment before disposal.

A number of dry processes have therefore been proposed. For instance, EP0710670 (Vomm Impianti e Processi S.r.L.) describes a continuous chemical modification process by which a starch powder and a modification agent, for example a hydrolytic agent or an alkylation agent, are introduced simultaneously into a thermostatically controlled turbo-reactor comprising a propeller rotating at 300-1500 revolutions per minute. This device enables, almost instantaneously, the creation of a fluid, fine, dynamic and highly turbulent layer of a close mix between the starch particles and the chemical agent.

With such a device, the chemical modification of starch can be carried out in much shorter time. For instance, Example 1 of the patent describes the hydrolysis at 50° C. of a maize starch by hydrochloric acid wherein the retention time of the starch in the reactor is only about 30 seconds. Unfortunately, this process requires the use of a specific device which, in addition to its high energy requirements, naturally increases production costs.

To overcome these drawbacks, EP0902037 (Roquette Frères) proposes a process for thinning starch under acidic conditions. The process is continuous with a reaction time of at least 5 minutes at 60 to 100° C.

Thus, although it is easier to obtain thinned starch with this process than by using a specific turbo-reactor, the processing time is longer and productivity is therefore reduced. In addition, a costly heating step is necessary to bring the temperature to the required 60-100° C.

It is therefore apparent that an improved process for the manufacture of thinned starch is desired. It is an object of the present invention to provide such a method.

STATEMENTS OF THE INVENTION

In a first aspect of the present invention, there is provided a biopolymer thinning process comprising the steps of:
(a) mixing a biopolymer substrate with a thinning agent and an alkalizing agent; and
(b) drying the mixture of step (a),
wherein:
  the thinning agent consists of one or more hypochlorites; and
  step (a) is carried out at a neutral to alkaline pH and does not involve any artificial heating.

In a preferred embodiment, the biopolymer substrate is selected from one or more starches and step (b) is carried out before the mixture of step (a) reaches the starch substrate's gelatinisation temperature.

In a second aspect of the present invention, there is provided a thinned biopolymer, preferably a thinned starch, obtainable according to the above method.

DETAILED DESCRIPTION OF THE INVENTION

Figure 1:
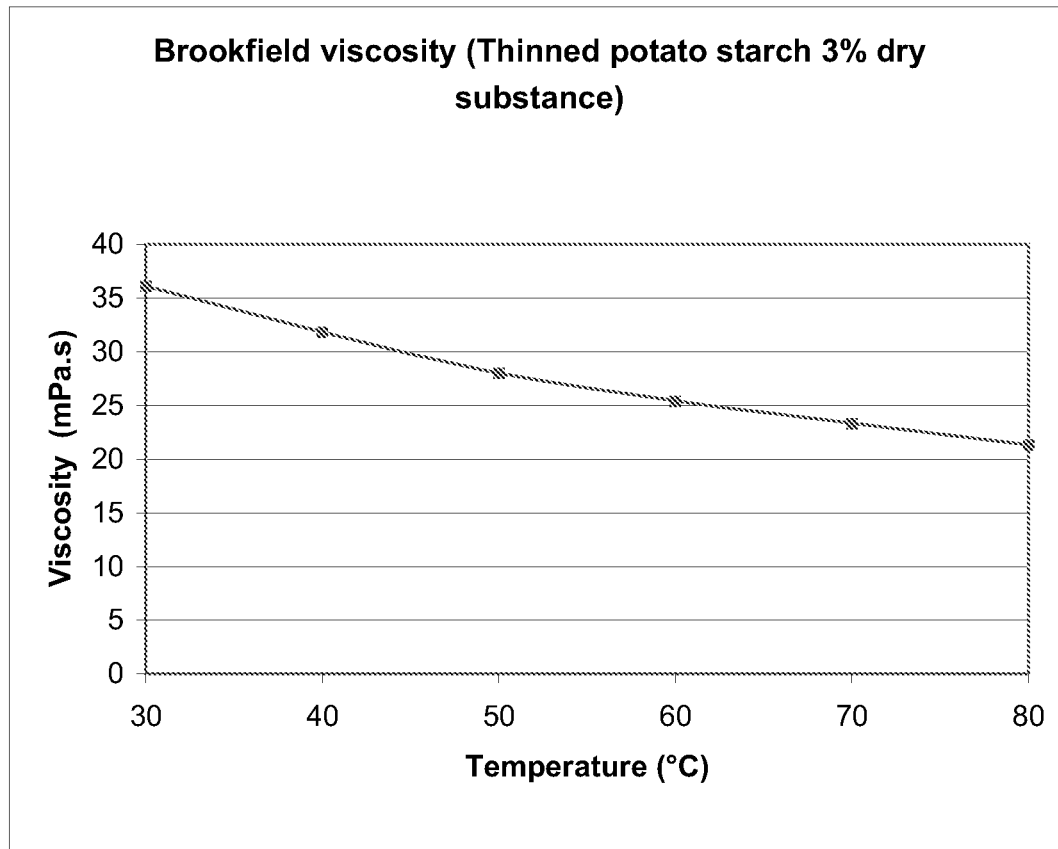
FIG. 1 shows the evolution, in relation to temperature, of the Brookfield viscosity of a thinned starch (3% dry substance).

All the percentages herein are percentages by dry weight, unless stated to the contrary.

The present invention relates to a biopolymer thinning process comprising the steps of:
(a) mixing a biopolymer substrate with a thinning agent and an alkalizing agent; and
(b) drying the mixture of step (a).

The term "biopolymer" as used herein refers to any naturally occurring molecule having a high number of individual monomer units. Typical examples include proteins and polysaccharides. Preferably, the biopolymer of the present invention will be selected from the group consisting of: starch, cellulose, pentosan, chitosan, chitine, pectin, hydrocolloids (such as xanthan gum or guar gum) and mixtures of two or more thereof. Especially preferred amongst these is starch. Thus, although the present process can be used to modify all sorts of biopolymers, the following description will concentrate on starch thinning.

One advantage of this process is that thinning step (a) does not require any artificial heating. The expression "artificial heating" refers to any heating step requiring an external provision of energy, e.g. a steam or electrically heated reactor, microwave heating, etc. Indeed, step (a) can be performed in any type of mixer known in the art capable of producing a homogeneous blend of reagents. Preferably, step (a) will be performed in a straightforward ploughshare type blender such as those marketed under the "LOEDIGE" brand.

It has indeed surprisingly been found that mixing the thinning agent with starch causes an exothermic reaction which generates enough heat to carry out the thinning process. In fact, the reaction is so efficient that a matter of minutes is sufficient to complete the thinning process.

Heating must then be stopped to prevent gelatinisation of the starch so that it can be handled and transported more easily.

Due to the fact that starch is a natural heterogeneous material, the temperature of gelatinization is different depending on the specific botanical source of the starch substrate being used.

The starch substrate of the present invention can be selected from any native or modified starches. Preferably, it will be selected from wheat starch, potato starch, waxy potato starch, maize starch, waxy maize starch, high amylose maize starch, tapioca starch and mixtures of two or more thereof. A modified starch is a starch whose structure has been altered by chemical, enzymatic or heat treatment. For instance, the starch substrate may be selected from esterified, etherified, cross-linked, oxidised or acid modified starches or mixtures of two or more thereof.

In addition to the type of starch being used, gelatinization temperature may also be affected by the moisture content, salt content and pH of the reaction medium.

Explanations of the phenomenon of gelatinization can be found in the literature, for instance in David J. Thomas and William A. Atwell, Starches, Eagan Press Handbook Series, American Association of Cereal Chemists, St. Paul, Minn. (1999), pages 25-30.

By way of example, the following table lists the gelatinization temperatures for a number of common starches:

| Starch source | Gelatinization temperature (° C.) |
|---|---|
| Wheat | 52-85 |
| Tapioca | 52-65 |
| Potato | 58-65 |
| Dent Corn | 62-80 |
| Waxy Corn | 63-72 |

Thus, the exothermic reaction must be controlled to prevent the specific gelatinization temperature of the starch substrate being reached. Preferably, the reaction temperature will not be allowed to exceed 60° C.

In order to control reaction temperatures, residence time will be limited. For clarity, "residence time" refers to the time required to carry out mixing step (a) plus any time between the end of that step and the beginning of step (b). Put another way, it begins as soon as the starch substrate is added to the mixer and includes any standing time or time required to transport the starch from the mixer to the dryer.

In addition to gelatinisation, residence time may also be affected by the amount and type of thinning agent being used, the type of starch substrate and the type of mixer. Taking all of these factors into consideration, the appropriate residence time will easily be determined by the skilled person.

By way of illustration, residence times will habitually not be more than 2 hours. In fact, the method of the present invention advantageously allows residence times to be reduced to less than 1 hour. Preferably, residence time will be less than 30 minutes, more preferably less than 15 minutes. According to one embodiment, residence time will be less than 10 minutes, more preferably less than 1 minute, even more preferably less than 30 seconds.

During step (b), water is removed from the reaction medium. Thus, while it is desirable that the mixture of step (a) have a moisture content of up to 45%, this should be reduced by at least 5% during step (b). Preferably, the moisture content will be reduced to 25% or less during step (b). Again, it is hard to define exact parameters as moisture content will depend on the type of starch being used, the desired degree of thinning, etc. Nonetheless, the appropriate moisture content and degree of drying will be apparent to the skilled person.

According to one embodiment, the mixture of step (a) will have a moisture content from 8-45%, preferably from 15-35%, and the dried mixture will have a moisture content from 0-25%, preferably from 2-20%, more preferably from 5-15%—provided that the moisture content is reduced by at least 5% between steps (a) and (b).

Step (b) may be achieved by any standard method and using any equipment known in the art to be suitable for this process. Preferably, step (b) will be achieved with a pneumatic dryer such as a flash dryer, ring dryer or fluid bed dryer. Most preferably, step (b) will be performed in a flash dryer. Advantageously, this drying step also acts as a cooling step: with water evaporating and the exothermic reaction being brought under control, the temperature of the reagents will drop. Thus, no additional cooling device is needed.

The reagents mixed in step (a) include the starch substrate as defined above, a thinning agent and an alkalizing agent.

The thinning agent is selected from one or more suitable hypochlorites such as sodium hypochlorite, calcium hypochlorite and potassium hypochlorite. Preferably, the thinning agent will be sodium hypochlorite.

In addition to their exothermic effect and to their thinning capacities, hypochlorites may also have an oxidizing effect on the starch. Advantageously, this oxidation will lead to the formation of carboxyl and/or carbonyl groups and therefore increase the stability of the thinned starch.

The thinning agent will be used in an amount of from 0.05 to 8% and preferably from 0.1 to 5%. The percentages cited are in terms of active chlorine based on the dry weight of starch.

The alkalizing agent may be any chemical available in the art having alkaline properties. Preferably, the alkalizing agent will be selected from sodium or potassium carbonate, sodium hydroxide, potassium hydroxide, calcium hydroxide, an organic base and mixtures of two or more thereof. It may be added in any form, e.g. in solid form or in solution. Preferably, it will be added in the form of a solution, more preferably in the form of a highly concentrated solution. Advantageously, the alkalizing agent will be added in a 25-50% w/w solution.

The quantity of alkalizing agent to be added will depend on the quantity and type of thinning agent used. For example, the molar ratio of alkalizing agent to active chlorine will preferably be from 0.01:1 to 100:1, more preferably from 0.05:1 to 50:1, even more preferably from 0.1:1 to 11:1.

In fact, the alkalizing agent should preferably be added in excess (either before or during the reaction). This is to counter the acidifying effect of carboxyl group formation. Indeed, t acidic pHs, hypochlorites are not stable and will decompose giving off chlorine gas. Thus, sufficient alkalizing agent should be added to the reaction medium to maintain a neutral to alkaline pH. Preferably, the pH of the reaction medium will be maintained at from 7 to 13 (at 10% solution).

Because of the quantity of agent that is added, some salts will be released into the reaction medium during thinning and will help prevent gelatinization thereby contributing to the production of a desirable product.

Such products, obtainable according to the above described process, also fall within the scope of the present invention. They will preferably have a level of thinning of up to 45%, more preferably from 8 to 40%, even more preferably from 10 to 30% and most preferably from 10 to 20%.

Figure 3:
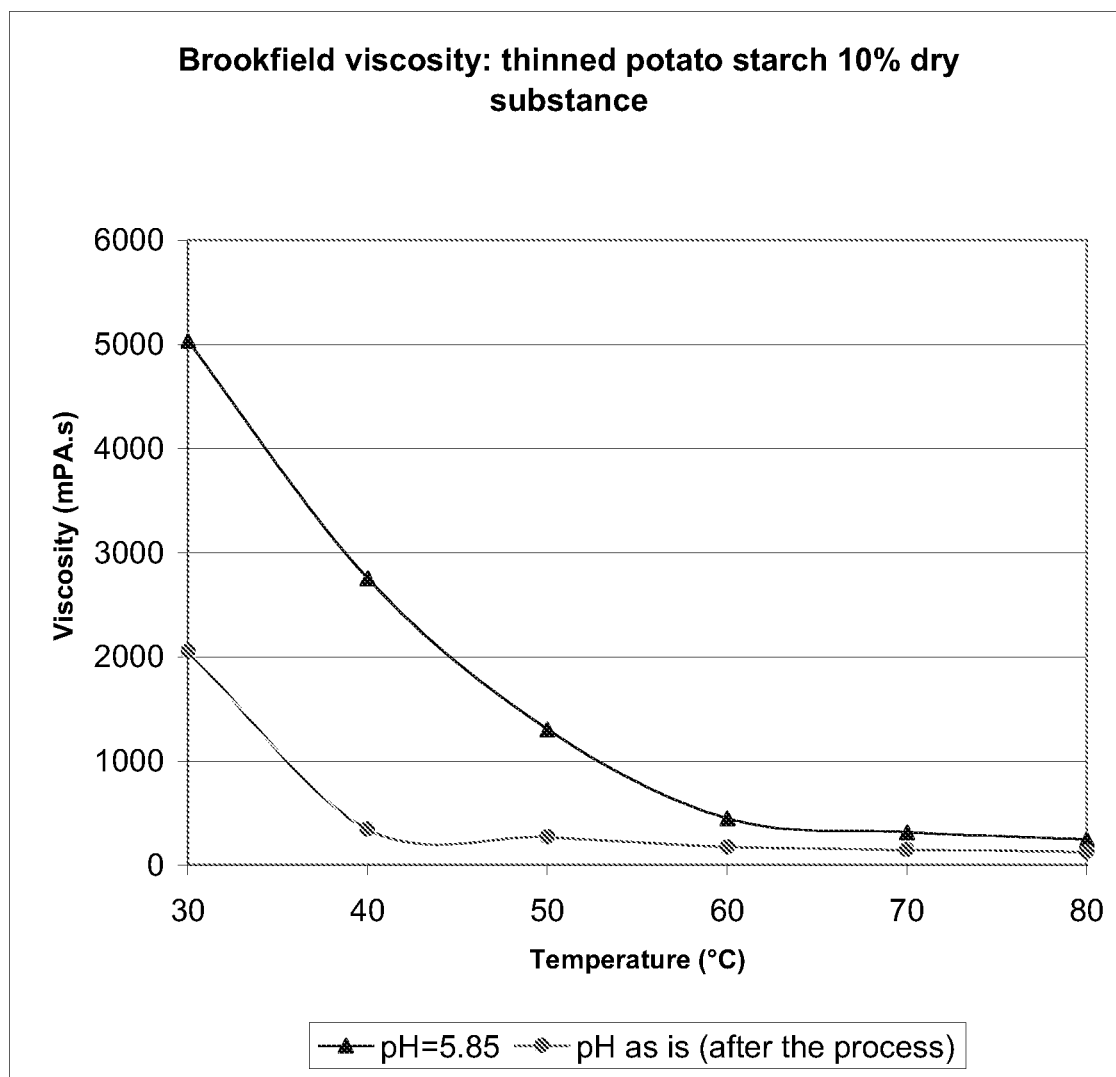
FIG. 3 shows the evolution, in relation to temperature, of the Brookfield viscosity of a thinned starch according to the invention (10% dry substance).

The level of thinning is here defined as the concentration of starch (dry substance) in water (weight/weight) which, after full gelatinisation, gives a Brookfield viscosity comprised between 100 and 1000 mPa·s, preferably between 100 and 600 mPa·s, at temperature above 40° C. when the pH is acid, or at a temperature above 60° C. when the pH is alkaline (see FIG. 3). The higher the concentration satisfying this requirement, the higher the level of thinning.

A viscosity comprised between 100 and 600 mPa·s allows an easy handling of the thinned starch product, for example when it has to be pumped. In order to remain within this viscosity range, un-thinned native starches can generally only be used at very low concentrations, e.g. 3 to 6%. By comparison, thinned starches can be uses at higher concentration of 10 to 40% dry solid.

Thus, an aqueous solution containing up to 40% of a thinned starch according to the present invention, at 30° C. for example, could still be within the viscosity limits mentioned above.

Such starches can be used in the textile industry, paper making industry (wet-end additive; surface sizing), the adhesives industry, pharmaceutical industry and various other industries.

The present invention will now be further defined by reference to the following examples. The invention described and claimed herein is not to be limited in scope by these specific embodiments which are only intended as illustrations of a number of possible aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

EXAMPLES

Example 1

Thinned/Oxidized Starch

Native potato starch (which has a gelatinisation temperature of about 65° C.), an alkalizing agent (NaOH) and a sodium hypochlorite solution were mixed for 30 seconds in an LOEDIGE mixer.

| | |
|---|---|
| Potato starch (16% moisture) | 61.0 Kg/h |
| NaOCl solution (155 g of Cl/l) | 3.16 L/h |
| NaOH (50% water solution) | 5.8 Kg/h |

The product coming out of the mixer (at a temperature of about 20-25° C.) was immediately dried in a flash drier for 15 seconds at 140° C.

Example 2

Brookfield Viscosity

The viscosity of the sample was measured with the Brookfield viscometer DV-II, using a 3% (w/w) slurry. This slurry was cooked in a boiling water-bath during 30 minutes under stirring conditions (250 rpm). The mixture was then cooled with water to a temperature of less than 30° C. and the viscosity was measured at different temperatures under stirring (100 rpm) and with spindle n.2.

Figure 2:
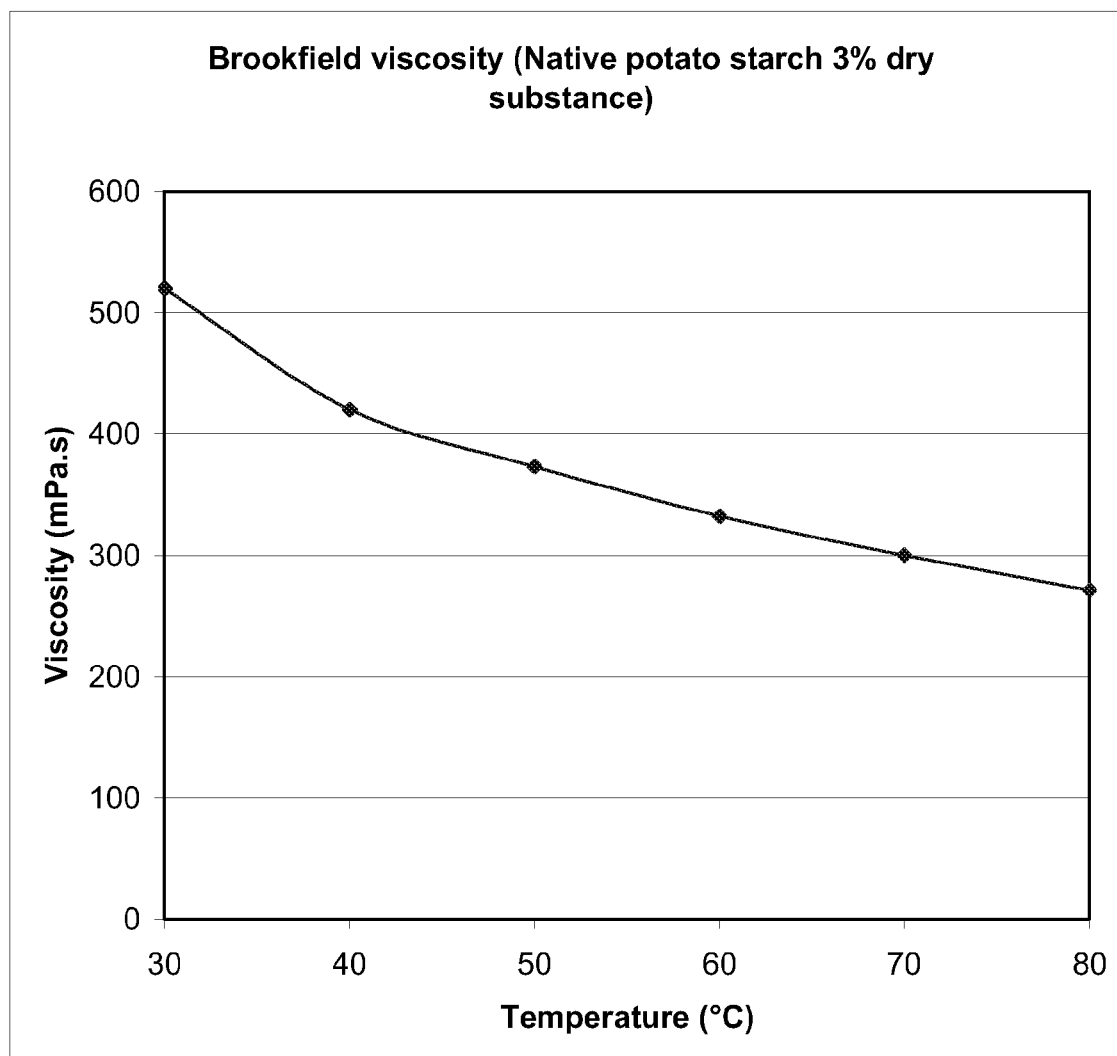
FIG. 2 shows the evolution, in relation to temperature, of the Brookfield viscosity of a native starch (3% dry substance).

In FIG. 1, the curve of the thinned starch is shown. To observe the thinning effect, it is useful to compare said curve with the one of FIG. 2 which is the viscosity curve of a native starch measured under the same conditions. The analysis has been done on a slurry containing 3% (dry substance) of the thinned starch.

At 60° C., for example, the viscosity of the thinned starch is around 25 mPa·s while the one of the native starch is around 330 mPa·s.

FIG. 3 shows the viscosity profile under the same conditions but this time the slurry contains 10% thinned starch.

The pH was reduced by using an acidic compound in order to measure the influence of this parameter on the viscosity. It is shown that the viscosity is higher at lower pH but is below 600 mPa·s in both cases at temperatures above 60° C., which is a normal temperature used on industrial scale to pump the starchy solutions.

Example 3

Thinned/Oxidized Starch

Potato starch, alkalizing agent, and sodium hypochlorite solution (169 g of $Cl_2$ per liter) were mixed for 30 seconds in an LOEDIGE mixer.

| | |
|---|---|
| Potato starch (18.7% moisture) | 53.3 Kg/h |
| NaOCl ($H_2O$ solution) | 7.7 l/h |
| NaOH (50% water solution) | 1.18 Kg/h |

The product coming out of the mixer was immediately dried in a flash drier at 140° C. for 8-10 seconds.

Example 4

Thinned/Oxidized Starch

Potato starch, alkalizing agent, and sodium hypochlorite solution (169 g of $Cl_2$ per liter) were mixed for 30 seconds in an LOEDIGE mixer.

| | |
|---|---|
| Potato starch (18.7% moisture) | 53.3 Kg/h |
| NaOCl ($H_2O$ solution) | 12.8 l/h |
| NaOH (50% water solution) | 1.18 Kg/h |

The product coming out of the mixer was immediately dried in a flash drier at 140° C. for 8-10 seconds.

The Brookfield viscosity of the products produced according to Examples 3 and 4 was measured using the method of Example 2. The results are set out in the following table:

| Ex | [Starch] | 80° C. | 70° C. | 60° C. | 50° C. | 40° C. | 30° C. | Carboxyl* |
|----|----------|--------|--------|--------|--------|--------|--------|-----------|
| 3  | 15%      | 35     | 70     | 110    | 180    | 200    | 520    | 0.3%      |
| 4  | 25%      | 55     | 65     | 84     | 90     | 170    | 374    | 0.5%      |

*corresponds to the % of carboxyl groups formed and therefore to the level of oxidation of the starch product. It is well known that carboxyl groups improve the paste stability of starch.

The invention claimed is:

1. A biopolymer thinning process comprising the steps of:
   (a) mixing a biopolymer substrate with a thinning agent and an alkalizing agent; and
   (b) drying the mixture of step (a), wherein:
   step (b) is initiated less than 10 minutes after the beginning of step (a);
   the thinning agent consists of one or more hypochlorites;
   step (a) is carried out at a neutral to alkaline pH and does not involve any artificial heating; and
   the drying in step (b) acts as a cooling for the thinning process started by mixing of the biopolymer substrate with the thinning agent in step (a).

2. The process of claim 1 wherein the biopolymer substrate is selected from at least one starch and wherein step (b) is carried out before the mixture of step (a) reaches the starch substrate's gelatinisation temperature.

3. The process of claim 2 wherein the one or more starches are selected from the group consisting of: wheat starch, potato starch, waxy potato starch, maize starch, waxy maize starch, high amylose maize starch and tapioca starch.

4. The process of claim 1 wherein step (b) is carried out before the mixture of step (a) reaches a temperature of 60° C.

5. The process of claim 1 wherein the one or more hypochlorites are selected from the group consisting of sodium hypochlorite, calcium hypochlorite and potassium hypochlorite.

6. The process of claim 1 wherein the alkalizing agent is selected from the group consisting of: sodium or potassium carbonate, sodium hydroxide, potassium hydroxide, calcium hydroxide and mixtures of two or more thereof.

7. The process of claim 1 wherein the alkalizing agent is in the form of a solution.

8. The process of claim 1 wherein the moisture content of the mixture of step (a) does not exceed 45% by weight.

9. The process of claim 1 wherein the moisture content is reduced by at least 5% during step (b).

10. The process of claim 1 wherein the moisture content is reduced to 25% or less during step (b).

11. The process of claim 1 wherein the mixture of step (a) has a pH of 7 to 13.

12. A thinned biopolymer obtainable by the process of claim 1.

13. A thinned starch obtainable by the process of claim 1.

14. A biopolymer according to claim 12 or a starch according to claim 13 having a level of thinning from 8 to 40%, wherein the level of thinning is defined as the concentration of starch (dry substance) in water (weight/weight) that, after full gelatinisation, gives a Brookfield viscosity of between 100 and 1000 mPa-s at a temperature above 40° C. in acid pH or a temperature of 60° C. in alkaline pH.

15. The process of claim 1, wherein step (b) is initiated less than 1 minute after the beginning of step (a).

16. The process of claim 1, wherein step (b) is carried out with a pneumatic dryer.

17. The process of claim 16, wherein step (b) is carried out with a flash dryer.

18. The process of claim 1, wherein step (a) is performed in a ploughshare-type blender.

19. The process of claim 1, wherein step (b) is initiated less than 30 seconds after the beginning of step (a).

20. The process according to claim 1, wherein the thinning agent is used in an amount of from 0.05% to 8% by weight active chlorine based on the dry weight of the starch.

21. The process according to claim 20, wherein the thinning agent is used in an amount of 0.1% to 5% by weight active chlorine based on the dry weight of the starch.

22. The process according to claim 1, wherein the mixture of step (a) has a moisture content from 8 to 45% by weight and the dried mixture obtained in step (b) has a moisture content from 0 to 25% by weight, provided that the moisture content is reduced by at least 5% by weight between the beginning of step (a) and the end of step (b).

23. The process according to claim 22, wherein the mixture of step (a) has a moisture content from 15 to 35% by weight, and the dried mixture obtained in step (b) has a moisture content from 2 to 20% by weight.

* * * * *